Jan. 2, 1934.  E. P. MUNTZ  1,941,812
MACHINE FOR THE PRODUCTION OF A PLURALITY OF SUBSTANTIALLY SIMILAR UNITS
Filed Jan. 9, 1933  2 Sheets-Sheet 1
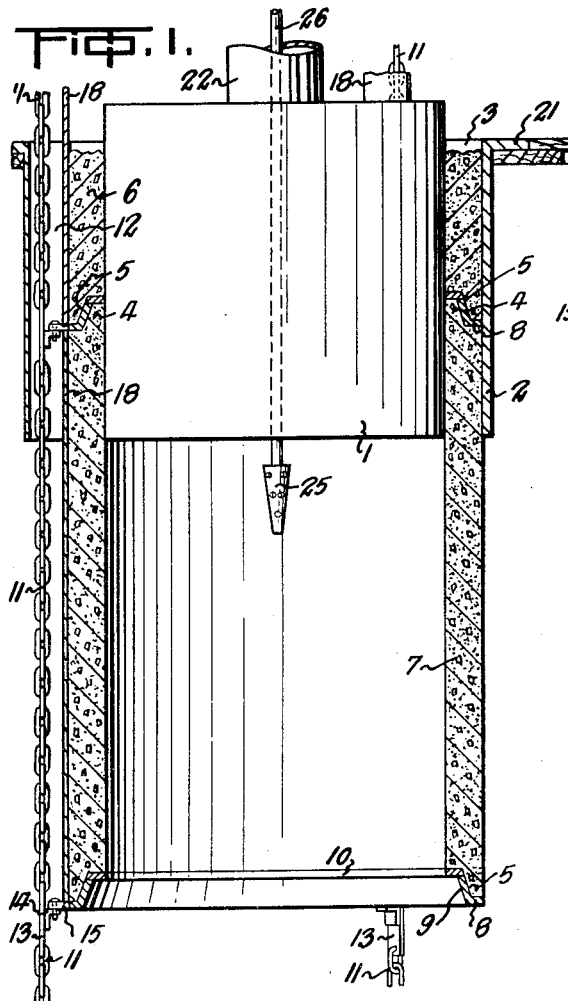
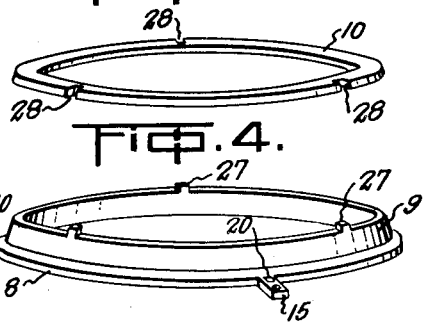
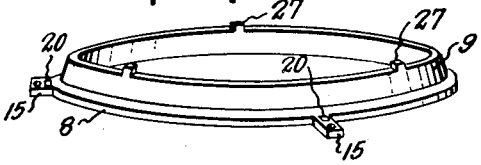
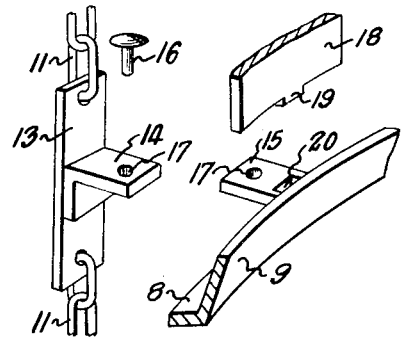
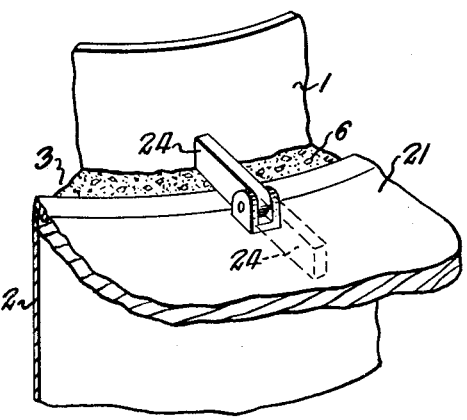
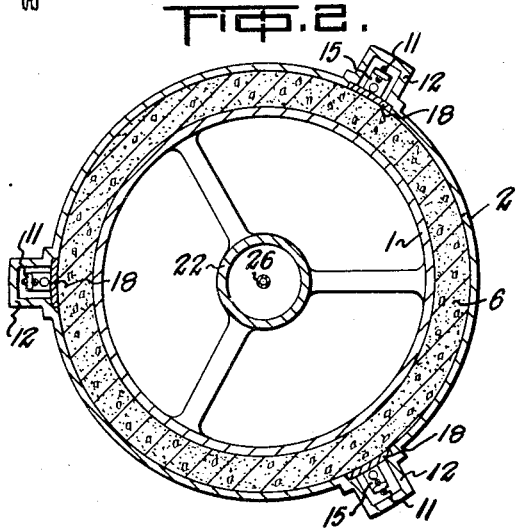
Inventor
Eric P. Muntz Jan. 2, 1934.  E. P. MUNTZ  1,941,812
MACHINE FOR THE PRODUCTION OF A PLURALITY OF SUBSTANTIALLY SIMILAR UNITS
Filed Jan. 9, 1933　　2 Sheets-Sheet 2
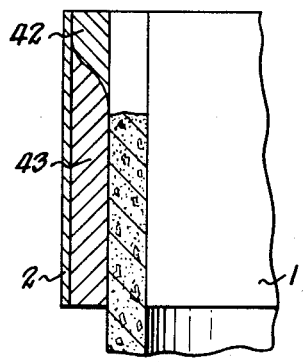
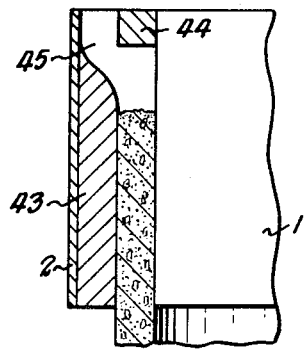
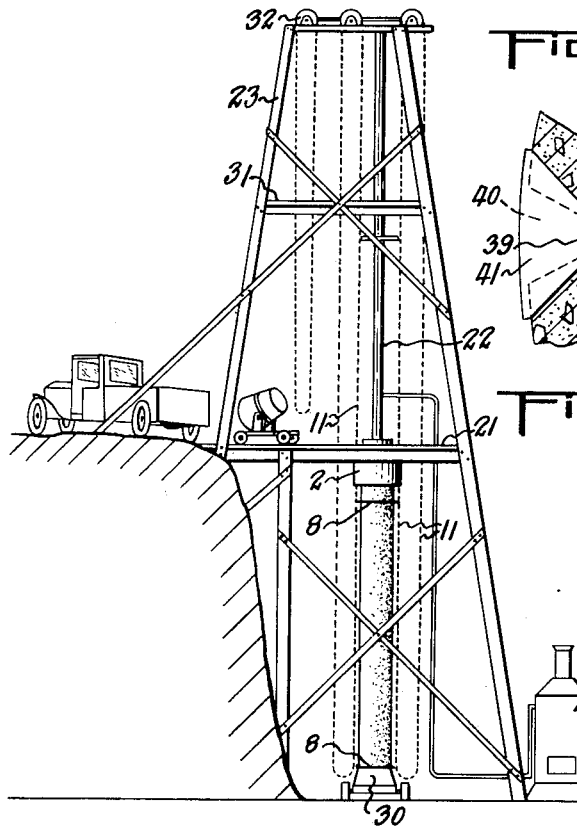
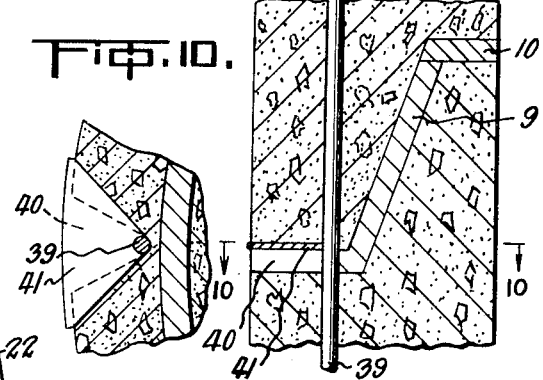
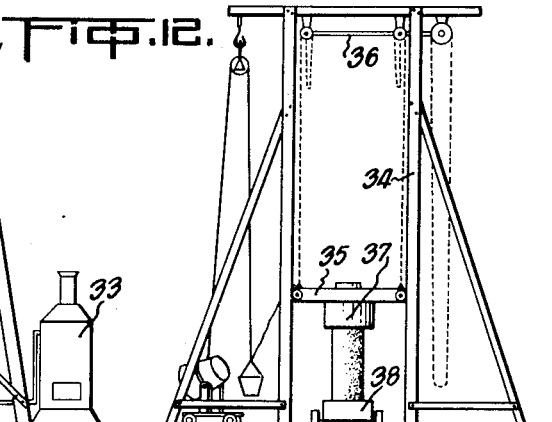
Inventor
Eric P. Muntz Patented Jan. 2, 1934

1,941,812

UNITED STATES PATENT OFFICE 1,941,812

MACHINE FOR THE PRODUCTION OF A PLURALITY OF SUBSTANTIALLY SIMILAR UNITS

Eric Percival Muntz, Hamilton, Ontario, Canada

Application January 9, 1933, Serial No. 650,885, and in Canada April 21, 1932

9 Claims. (Cl. 25—30)

My invention relates to a machine for the production of a plurality of substantially similar units cast from a plastic mass, and though my machine can be used for the production of different classes of units such as cast blocks, structural members, etc., it is more particularly directed towards the production of concrete pipe lengths or concrete driving piles of substantially the same form as concrete pipes. The object of my invention is to produce a machine in which the pipe or unit being cast is cured during manufacture and before it is released from the machine, and in the attainment of this object I furnish a machine provided with a mold open at its top and bottom and into which the plastic mass, such as concrete, is poured, the bottom of the mold being sealed during the initial pouring process with a suitable base member, the base member and mold being gradually moved apart as the plastic mass within the lower portion of the mold becomes sufficiently set, such molded plastic mass then protruding from the bottom of the mold and resting upon the base member.

A further object of my invention is to furnish two types of machines of the same basic principle, in the first, or my preferred type, the base member is moved downwardly away from the bottom of the mold as the contained plastic mass is molded and in the second type the mold is moved upwardly from the base member as the contained plastic mass is molded, and another particular object of my invention is to furnish a plurality of base members which are adapted to pass through the mold to separate and support a succession of pipe lengths or units.

A still further object of my invention, as relating to the casting of concrete pipes, is to furnish pipe end forming pallets which pass through the mold and support the successive pipe lengths as they are molded, such pallets being supported independently of the mold or the molded pipe, and another object of my invention directed particularly to the manufacture of metal reinforced concrete pipe is to utilize the reinforcements around which the plastic mass is cast as the means for supporting that portion of the pipe protruding from the bottom of the mold during the casting process apart altogether from the pipe end forming pallet.

My invention contemplates the manufacture of bell mouthed cast pipes by the provision of a suitable liner arrangement within the mold as shall hereinafter appear.

My invention consists of a molding machine constructed and arranged all as hereinafter more particularly described and illustrated in the accompanying drawings in which my machine is shown particularly constructed for the manufacture of concrete pipe lengths and the like.

Fig. 1 is a vertical cross sectional view through the mold of my machine and also through a pair of pipe lengths passing therethrough.

Fig. 2 is a horizontal cross sectional view through the mold and contained pipe as shown in Fig. 1.

Fig. 3 is a perspective view of the upper portion of a pipe end forming pallet.

Fig. 4 is a perspective view of the lower portion of the pipe end forming pallet.

Fig. 5 is an enlarged perspective view of a fragmentary portion of the pallet together with the pallet supporting element and mold closure strip therefor, such parts being shown dissassembled and separated from one another.

Fig. 6 is a perspective view of a fragmentary portion of the mold showing a centering member which may be used for retaining the inner mold in position.

Fig. 7 is a cross sectional view through a fragmentary portion of my mold as adapted for casting bell mouthed pipe ends, such mold corresponding in size to that illustrated in Fig. 1.

Fig. 8 is a similar view to Fig. 7 showing a further step in the molding of the bell mouthed pipe end.

Fig. 9 is an enlarged vertical cross sectional view through a fragmentary portion of a pallet together with fragmentary portions of two pipe ends molded thereby, a reinforcing rod being shown extending through the pipes and the pallet, the pallet being cut away for the reception of the reinforcing rod.

Fig. 10 is a horizontal cross sectional view of a fragmentary portion of the assembly illustrated in Fig. 9, such view being taken through the line 10—10, Fig. 9.

Fig. 11 is a side elevational view of my first type of machine wherein the pipe bottom supporting member moves downwardly from the mold, and Fig. 12 is a side elevational view of my second form of machine wherein the mold moves upwardly from the pipe bottom supporting member.

Like characters of reference indicate corresponding parts in the different views.

The purpose of this invention is to provide an economical means for producing either dry tamp or wet poured molded units such as pipe lengths and in which my device will eliminate the necessity of re-handling before curing, thus materially reducing the cost of labour and equipment.

In other type of concrete pipe molding devices the pipe either has to remain completely within the mold until it is sufficiently cured to permit its removal after which it is transported to a kiln for further curing under heat, or the pipe and its mold may be moved directly into a kiln after the concrete is poured. In both these processes the molds are costly to manufacture and, of course, the process of pipe production is slow as compared with my method as the molds have to remain in place until the contained concrete is cured. There are other processes for the manufacture of concrete pipe wherein the concrete is spun within a mold or applied to a mold with a cement gun, but these processes are expensive and require quite an elaborate permanent equipment.

In my type of machine as illustrated in Figs. 1, 2 and 11, wherein the pipe, as molded, is dropped downwardly from the mold, I furnish a pair of inner and outer forms 1 and 2, the inner form 1 being spaced away from and substantially concentric with the outer form 2 so that a concrete receiving mold 3 is formed, such mold being open at its top and bottom, the open top being for the reception of concrete and the open bottom permitting the passage of pipe from the mold. It is to be, of course, understood that the forms 1 and 2 are comparatively short in length and that pipes of any length can be molded, such length being only governed by the height of the forms from the ground level.

As concrete pipes, in general practice, are adapted to fit end to end, they are formed at one end with a male tongue 4 and at the other end with a female recess 5 in which the tongue is received. For forming these ends metal pallets of the required shape are used, each pallet being in two parts substantially as illustrated in Figs. 3 and 4, the pallet being adapted to pass through the mold and form or mold the male and female ends of two successive pipe lengths as 6 and 7, illustrated in Fig. 1.

The lower portion of the pallet as illustrated in Fig. 4, comprises a circular flange 8 of substantially the same outer diameter as the diameter of the outer form 2 and formed at its inner edge with an upwardly and inwardly inclined circular ring 9 which, in turn, supports a removable flange 10 as illustrated in Fig. 3, such flange having substantially the same inside diameter as the diameter of the inner form 1. It will thus be seen upon reference to Fig. 1 that the pallet extends from the outer to the inner form and by this shape forms or molds complementary male and female pipe ends 4 and 5.

As the pallets support the pipe lengths in their downward passage through the bottom of the mold, they have to be supported for downward movement in any suitable manner. In the construction illustrated in the drawings, I furnish a plurality of endless chains 11 which are suspended from suitable points above the mold and extend downwardly through channels 12 opening into the inner face of the outer mold. The pallets are detachably connected to and supported by the chains 11 in any suitable manner and in Fig. 5, I have illustrated a type of connection that may be used.

In this type of connection I incorporate link plates 13 in the chains 11 to which angle pieces 14 are attached. The angle pieces 14 support lugs 15 extending from the flanges 8 of the pallets and projecting into the channels 12. For securing the lugs 15 and angle pieces 14 against accidental displacement, I use locking pins 16 which are dropped into orifices 17 in the angle pieces and lugs 15. In order to prevent the poured concrete in the mold 3 from entering the channels 12, I furnish suitable strips 18 which extend across the entrances to the channels and are supported by the lugs 15 of the pallets. These strips move downwardly in conjunction with the chains, pallets and pipe lengths and are removed with the removal of the pipe lengths as they become clear of the bottom of the mold. To prevent accidental displacement of the strips 18 before they pass into the upper end of the mold and also to retain them from falling away from the pipe as it emerges from the mold, I may furnish a lug 19 upon the bottom of each strip which is adapted to be seated in an orifice 20 in the lug 15.

The outer mold 2 projects downwardly from the filling platform 21 and the inner mold is supported by any suitable element such as a pipe 22 depending from an overhead structure 23 such as illustrated in Fig. 11. As the inner form 1 may, under certain conditions, have a tendency to move out of centre with the outer form 2 at such times as there is no pallet passing between the forms, I furnish a plurality of swingably mounted spreader arms 24 which are carried upon the filling platform 21 and adapted to swing into and out of engagement with the inner form 1 which projects above the platform as illustrated in Fig. 5.

In the production of pipe lengths with a machine as hereinbefore described, the chains 11 and the first pipe end supporting pallet are arranged so that the pallet is in the upper portion of the mold and concrete is poured into the mold on top of the pallet. When sufficient concrete has been positioned within the mold to reach the vicinity of the top thereof, the chains 11 are gradually lowered either by hand or mechanically, more concrete being continuously added, thus causing the pallet and the molded lower end of the pipe to move through the mold and eventually from the bottom thereof, the concrete taking sufficient set in its passage from the top to the bottom of the mold. Concrete is continuously added at the upper end of the mold in relation to the downward travel of the supporting pallet. In order to commence the curing of the pipe immediately it commences to project from the mold, I furnish any suitable heat supplying means preferably a steam jet 25 which projects from a steam pipe 26 contained within the form supporting pipe 22, the steam furnishing a wet heat which is most preferable in the curing of concrete.

When a pipe section of the predetermined length had been formed, that is the length from the supporting pallet to the top of the mold, a second pallet is either carried down by the chains 11 or positioned in place upon the top of the concrete in the mold in any suitable manner, the upper ring 10 of the pallet being removed in order to permit the insertion of the concrete behind the inclined ring 9 of the lower pallet portion. When the concrete has been brought up to the level of the top of such portion, the ring 10 is placed thereon and in order that it may be correctly centered I furnish the upper portion of the ring 9 with a plurality of studs 27 which project into slots 28 in the ring 10. The lower pipe section still continues its downward movement and concrete is then inserted in the mold on top of the next pallet and the second pipe length commenced.

All the time that the first pipe length is emerging from the mold it is subjected to the curing heat of the steam and when it is completely clear of the bottom of the mold it is in condition to be handled for immediate removal if so desired, and if the pouring platform is sufficiently high above the pipe receiving level and a plurality of relatively short pipe lengths form the pipe stack between the receiving level and the bottom of the mold, the pipe in the bottom of the stack will be sufficiently cured for safe immediate shipment if so desired. This removal is very readily achieved by the use of a lift truck or any other similar or suitable device which is positioned underneath the bottom of the pipe section and is lifted to receive such pipe section as it descends. When the pipe section rests upon the raised lift truck the connections between the lower pallet and the chains 11 are disconnected and the lift truck lowered, thus removing the pipe length away from the next pallet which permits its complete removal.

In Fig. 11, I have illustrated the structure 23 such as may be erected for the production of pipe lengths upon the site of the job. The structure 23 is shown built adjacent to the brow of a mound or hill so that the filling platform 21 extends from the upper ground level and the pipe receiving apparatus including the lift truck 30 is positioned upon the lower ground level. In this way materials can be conveniently delivered to the filling platform and the complete pipe lengths conveniently removed. The structure as illustrated shows a second platform 31 positioned above the filling platform 21 and from which the pallets may be connected to the chains 11. I also show a hand chain mechanism 32 for actuating the chains 11, though it is to be understood that mechanical means may be employed and I also show a boiler 33 for furnishing steam to the jet 25. The upper end of the inner form supporting pipe 22 is suitably secured to the upper portion of the structure 23.

The apparatus as illustrated in Fig. 12 shows my second type in which any suitable supporting structure 34 is provided to carry a vertically movable filling platform 35. This platform 35 is suitably supported within the structure as by a chain lift mechanism 36 and contains a mold assembly 37 similar in construction to the assembly already described, the supporting chains 11 and channels 12 being, of course, eliminated. The lift truck 38 is positioned underneath the mold assembly 37 and the platform 35 lowered until the bottom of the mold rests adjacently to a pallet supported upon the lift truck 38 which is in its raised position.

The concrete is lifted on to the platform 35 and poured into the mold as already described and when the mold is partially filled and the lower contained concrete set, the platform 35 is gradually moved upwardly away from the lift truck so that the pipe commences to protrude from the mold and rest upon the lift truck. The raising of the platform 35 continues as the concrete within the mold sets and is ready to pass through the bottom thereof. When the pipe length is completed and passed from the mold, the lift truck 38 is lowered which lowers the pipe length clear of the mold and permits its removal.

It is to be understood that with either pieces of apparatus as described that any number of pipes can be cast one on top of the other, the number of such pipe lengths forming a stack only being governed by the height of the pouring platform above the pipe receiving level and that any suitable movable means may be provided for receiving the pipe stack and setting it aside so that another stack of pipe lengths can be passed through the mold. In cases where it is so desired an apparatus can be provided wherein the stack of pipe lengths may be left stationary and the mold moved to one side so that the next stack can be adjacently commenced.

In the pipe construction illustrated in Figs. 9 and 10 wherein I furnish reinforcing rods 39 extending longitudinally through the pipe wall and which may or may not be attached to reinforced mesh molded in the pipe, I may utilize such rods as a means for supporting the pallets instead of the chain structure as illustrated in Figs. 1 and 2. To permit the ready insertion of the rods 39 into the flange 8 of the pallet. I form such flange with a plurality of V shaped cut away portions 40, in the apices of which the rods 39 are positioned. In order to prevent the poured concrete from entering these cut away portions, I position removable metal shield plates 41 thereover.

When two molded pipe ends, as illustrated in Fig. 9, have passed from out of the bottom of the mold and it is desired to remove the bottom completed pipe section, it is only necessary to sever the rods 39 at the points where they extend through the pallet flange 8 which can be readily done by the use of a cold chisel. When the rods 39 are severed. the lower pipe section can be removed as the adhesion of the set concrete in the next pipe length to the rods 39 is quite sufficient to permit the rods supporting such pipe length as it protrudes from the mold.

Figs. 7 and 8 illustrate my device as arranged for the production of bell mouthed pipe. In this case a pair of liner sleeves 42 and 43 are fitted inside the outer form 2, the space between the inner face of such sleeve and the outer face of the inner form 1 constituting the plastic mass receiving mold. The lower face of the upper sleeve 42 and the upper face of the lower sleeve 43 abut and are curved as is the outer face of the bell mouthed pipe. In the production of this type of pipe the plastic mass is poured into the mold and the molded pipe passed from the bottom of the mold as hereinbefore described and the process continued until the bell mouthed pipe end is to be molded. When this stage is reached, as illustrated in Fig. 7, the liner sleeve 42 is removed through the upper end of the mold and a third sleeve 44 inserted. This third sleeve 44 extends around the upper end of the inner form 1 and is provided to mold the female shoulder in the bell mouthed end. The molds 43 and 44 are thus arranged in the position illustrated in Fig. 8 and the balance of the plastic mass is poured into the mold portion 45. When the pouring is completed the liner sleeve 43 which has been held against downward movement during the prior production of the pipe is now released and passes downwardly from out of the bottom of the mold with the bell mouthed end. After which it is, of course, removed and repositioned within the form 1 for the production of another pipe length.

Although I have illustrated my machine in Figs. 11 and 13 as only furnished with one mold apiece, it is to be understood that in practice I provide a plurality of molds in each structure so that a number of pipe lengths are being produced at the same time and that my apparatus can be used for the production of bell mouth pipe, oval pipe, segmental sections or in fact any cast unit in which comparatively large duplication is required, and although I have shown and described a particular embodiment of my invention it is to be understood that I can make such changes and alterations as I may, from time to time, deem necessary without departing from the spirit of my invention as set forth in the appended claims.

What I claim as my invention is:

1. In a machine for molding concrete pipes and the like, a plastic mass receiving pipe mold open at its top and bottom, an outer substantially cylindrical form, a plurality of channels opening into the inner face of the outer form, an inner form contained within and spaced away from the outer form whereby the mold is constituted, a pipe end forming and supporting pallet adapted to pass through the mold, pallet supporting movable elements contained within the channels, connections extending from the pallet to the elements, and means for moving the supporting elements and pallet downwardly away from the bottom of the mold during the molding process.

2. In a machine for molding concrete pipes and the like, a plastic mass receiving pipe mold open at its top and bottom, an outer substantially cylindrical form, a plurality of channels extending from top to bottom of the form and opening into its inner face, pallet supporting movable elements suspended above the mold and extending downwardly through the channels, a plurality of pipe end forming and supporting pallets adapted to pass through the mold, connections extending from the pallets to the movable elements, and means for moving the supporting elements and pallets downwardly through and away from the bottom of the mold during the molding process.

3. In a machine for molding concrete pipes and the like, a plastic mass receiving pipe mold open at its top and bottom, an outer substantially cylindrical form, an inner substantially cylindrical form contained within and spaced away from the inner face of the outer form whereby the mold is constituted, a pipe supporting pallet adapted to pass downwardly between the inner and outer forms to and through the bottom of the mold, and downwardly travelling means to which the pallet is detachably secured and by which it is supported.

4. In a machine for molding concrete pipes and the like a plastic mass receiving pipe mold open at its top and bottom, an outer substantially cylindrical form, an inner substantially cylindrical form contained within and spaced away from the inner face of the outer form whereby the mold is constituted, a succession of pallets adapted to pass downwardly between the inner and outer forms to and through the bottom of the mold, and downwardly travelling means by which the pallets are detachably supported in spaced apart relation.

5. In a machine for molding concrete pipes and the like, a plastic mass receiving pipe mold open at its top and bottom, an outer substantially cylindrical form, an inner substantially cylindrical form contained within and spaced away from the inner face of the outer form whereby the mold is constituted, a pipe end supporting pallet initially positioned in the vicinity of the upper portion of the mold, and adapted to pass downwardly through the mold, and downwardly travelling means positioned exteriorly of the mold to which the pallet is detachably secured and by which it is supported.

6. In a machine for molding concrete pipes and the like, a plastic mass receiving pipe mold open at its top and bottom, an outer substantially cylindrical form, an inner substantially cylindrical form contained within and spaced away from the inner face of the outer form whereby the mold is constituted, a pipe end supporting pallet initially positioned in the vicinity of the upper portion of the mold, and adapted to pass downwardly through the mold, and a plurality of endless flexible members positioned exteriorly of the mold upon which the pallet is detachably suspended.

7. In a machine for molding concrete pipes and the like, a plastic mass receiving pipe mold open at its top and bottom and from the bottom of which the plastic mass passes in pipe form after it is molded, a pipe section dividing and pipe end forming pallet adapted to pass downwardly through and out of the mold, and means positioned independently of the mold or the contained plastic mass for supporting the pallet both in its passage through the mold and after it leaves the mold.

8. In a machine for molding units of substantially similar form from a plastic mass, a plastic mass receiving mold open at its top and bottom and from the bottom of which the plastic mass passes after it is molded, a unit dividing and supporting member adapted to pass downwardly through and out of the mold, and means positioned independently of the mold or the contained plastic mass for supporting the unit supporting member both in its passage through the mold and after it leaves the mold.

9. In a machine for molding bell-mounted concrete pipes and the like, a plastic mass receiving pipe mold open at its top and bottom, an outer substantially cylindrical form, an inner substantially cylindrical form contained within and spaced from the inner face of the outer form whereby the mold is constituted, a liner sleeve detachably fitted within a recess of enlarged diameter in the top of the outer form, a second sleeve of substantially the same outer diameter as the exterior diameter of the pipe and adapted to be positioned about the top of the inner form upon removal of the liner sleeve from the outer form, and a pipe supporting pallet adapted to pass downwardly between the inner and outer forms, and downwardly travelling means to which the pallet is detachably secured and by which it is supported.

ERIC PERCIVAL MUNTZ.